United States Patent
Dino et al.

(10) Patent No.: US 7,906,461 B2
(45) Date of Patent: Mar. 15, 2011

(54) THERMALLY STABLE COMPOSITIONS AND USE THEREOF IN DRILLING FLUIDS

(75) Inventors: David Dino, Cranbury, NJ (US); Jeffrey Thompson, East Windsor, NJ (US); Richard Geurtsen, Robbinsville, NJ (US)

(73) Assignee: Elementis Specialties, Inc., Hightstown, NJ (US)

( * ) Notice: Subject to any disclaimer, the term of this patent is extended or adjusted under 35 U.S.C. 154(b) by 45 days.

(21) Appl. No.: 12/517,410

(22) PCT Filed: Oct. 22, 2007

(86) PCT No.: PCT/US2007/082124
§ 371 (c)(1),
(2), (4) Date: Jun. 3, 2009

(87) PCT Pub. No.: WO2009/054843
PCT Pub. Date: Apr. 30, 2009

(65) Prior Publication Data
US 2010/0009873 A1    Jan. 14, 2010

(51) Int. Cl.
C09K 8/32 (2006.01)
C09K 8/60 (2006.01)
E21B 21/00 (2006.01)
E21B 43/16 (2006.01)

(52) U.S. Cl. ....... 507/117; 166/305.1; 175/65; 507/129; 507/138; 507/219; 507/241; 507/260; 507/267

(58) Field of Classification Search .................. 507/117, 507/129, 138, 219, 241, 260, 267; 166/305.1; 175/65
See application file for complete search history.

(56) References Cited

U.S. PATENT DOCUMENTS

| | | |
|---|---|---|
| 2,355,356 A | 9/1944 | Young, Jr. |
| 2,461,730 A | 2/1949 | Gunderson |
| 2,482,760 A | 9/1949 | Goebel et al. |
| 2,482,761 A | 9/1949 | Goebel et al. |
| 2,731,481 A | 1/1956 | Harrison et al. |
| 2,775,617 A | 12/1956 | Shapiro et al. |
| 2,793,219 A | 5/1957 | Barrett et al. |
| 2,964,545 A | 12/1960 | Harrison |
| 2,978,468 A | 4/1961 | Hampton et al. |
| 2,994,660 A | 8/1961 | Reddie |
| 3,134,759 A | 5/1964 | Kirkpatrick |
| 3,136,819 A | 6/1964 | Shapiro et al. |
| 3,157,681 A | 11/1964 | Fischer et al. |
| 3,252,820 A | 5/1966 | Vignolo et al. |
| 3,256,304 A | 6/1966 | Fischer et al. |
| 3,514,399 A | 5/1970 | Robinson |
| 3,726,838 A * | 4/1973 | Eimer et al. .................. 528/67 |
| 3,977,894 A | 8/1976 | White et al. |
| 4,039,459 A | 8/1977 | Fischer |
| 4,105,578 A | 8/1978 | Finlayson et al. |
| 4,287,086 A | 9/1981 | Finlayson et al. |
| 4,402,881 A | 9/1983 | Alther |
| 4,435,636 A | 3/1984 | Royston |
| 4,474,705 A | 10/1984 | Clay et al. |
| 4,505,833 A | 3/1985 | Lipowski |
| 4,508,628 A | 4/1985 | Walker |
| 4,517,112 A | 5/1985 | Mardis et al. |
| 4,631,136 A | 12/1986 | Jones, III |
| 4,664,820 A | 5/1987 | Magauran et al. |
| 5,021,170 A | 6/1991 | Shumate et al. |
| 5,034,136 A | 7/1991 | Cody et al. |
| 5,260,268 A | 11/1993 | Forsberg |
| 5,330,662 A | 7/1994 | Jahnke |
| 5,336,647 A | 8/1994 | Nae et al. |
| 5,340,390 A | 8/1994 | Magauran et al. |
| 5,389,200 A | 2/1995 | Cody et al. |
| 5,445,179 A | 8/1995 | DiLullo et al. |
| 5,536,871 A | 7/1996 | Santhanam |
| 5,599,777 A | 2/1997 | Jahnke |
| 5,620,946 A | 4/1997 | Jahnke |
| 5,634,969 A | 6/1997 | Cody et al. |
| 5,710,108 A | 1/1998 | McNally et al. |
| 5,710,110 A | 1/1998 | Cooperman et al. |
| 5,753,731 A | 5/1998 | Yoshioka et al. |
| 5,909,779 A | 6/1999 | Patel et al. |
| 5,939,475 A | 8/1999 | Reynolds |
| 6,187,719 B1 | 2/2001 | Dino |
| 6,291,406 B1 | 9/2001 | Rose et al. |
| 6,291,633 B1 | 9/2001 | Nakamura |
| 6,339,048 B1 | 1/2002 | Santhanam |
| 6,462,096 B1 | 10/2002 | Dino |
| 6,576,597 B2 | 6/2003 | Dobson, Jr. |

(Continued)

FOREIGN PATENT DOCUMENTS

EP    1018534    7/2000

(Continued)

OTHER PUBLICATIONS

PCT/ISA/210: International Search Report for International Patent Application No. PCT/US07/82124, dated Mar. 27, 2008.

PCT/ISA/220: Notification of Transmittal of the International Search Report and the Written Opinion of the International Searching Aurthority for International Patent Application No. PCT/US07/82124, dated Mar. 27, 2008.

PCT/ISA/237: Written Opinion of the International Searching Authority for International Patent Application No. PCT/US07/82124, dated Mar. 27, 2008.

(Continued)

*Primary Examiner* — Timothy J. Kugel
(74) *Attorney, Agent, or Firm* — Morgan, Lewis & Bockius LLP

(57) ABSTRACT

A composition is comprised of a mixture of the reaction product of an amine and a poly-functional isocyanate, and the reaction product of (i) a carboxylic acid with at least two carboxylic moieties; (ii) a polyamine having an amine functionality of two or more; and a chemical selected from the group consisting of (i) alkoxylated alkyl amines, (ii) fatty acid amides and (iii) mixtures thereof, and it is used as a drilling fluid additive.

28 Claims, No Drawings

U.S. PATENT DOCUMENTS

| | | | |
|---|---|---|---|
| 6,589,917 B2 | 7/2003 | Patel | |
| 6,609,578 B2 | 8/2003 | Patel et al. | |
| 6,887,832 B2 | 5/2005 | Kirsner | |
| 7,278,485 B2 | 10/2007 | Kirsner | |
| 7,345,010 B2 | 3/2008 | Thompson et al. | |
| 7,387,985 B2 | 6/2008 | Kippie | |
| 7,456,135 B2 | 11/2008 | Kirsner et al. | |
| 7,462,580 B2 | 12/2008 | Kirsner et al. | |
| 7,488,704 B2 | 2/2009 | Kirsner et al. | |
| 7,534,743 B2 | 5/2009 | Kirsner et al. | |
| 7,547,663 B2 | 6/2009 | Kirsner et al. | |
| 7,799,742 B2 | 9/2010 | Dino | |
| 2003/0172475 A1* | 9/2003 | Desenne et al. | 8/408 |
| 2004/0102332 A1 | 5/2004 | Thompson et al. | |
| 2004/0110642 A1 | 6/2004 | Thompson et al. | |
| 2005/0049147 A1 | 3/2005 | Patel | |
| 2005/0187112 A1 | 8/2005 | Goodhue et al. | |
| 2006/0065402 A9 | 3/2006 | Fontana | |
| 2006/0073987 A1 | 4/2006 | Mueller | |
| 2007/0197403 A1 | 8/2007 | Dino | |
| 2007/0281867 A1 | 12/2007 | Massam | |
| 2008/0032900 A1 | 2/2008 | Kirsner | |
| 2008/0188382 A1 | 8/2008 | Thompson et al. | |
| 2009/0163386 A1 | 6/2009 | Dino | |
| 2009/0227478 A1 | 9/2009 | Dino | |

FOREIGN PATENT DOCUMENTS

| | | |
|---|---|---|
| WO | 89/11516 A | 11/1989 |
| WO | 2009054843 | 4/2009 |
| WO | 2010099167 | 9/2010 |

OTHER PUBLICATIONS

Fatty Nitrogen Derived Amides Categories, High Production Volume (HPV) Chemical Challenge, Assessment of Data Availability and Test Plan, American Chemistry Council's fatty Nitrogen Derivatives Panel Amides Task Group, Prepared by Toxicology/Regulatory Services, Inc., Sep. 2004.

J.W. Jordan, "Proceedings of the 10th National Conference on Clays and Minerals" Pergamon Press, Austin (1963), 299-308.

J. Lee, "A New Approach to Deepwater Drilling Using SBM with Flat Rheology" Copyright 2004, AADE-04-DF-HO-37, AADE 2004 Drilling Fluids Conference, Houston, Texas, Apr. 6-7, 2004, 1-13.

International Search Report for PCT/US2010/25185 dated Apr. 12, 2010; 1 page.

Office Action dated Aug. 19, 2010 for U.S. Appl. No. 11/963,182, 17 pages.

Advisory Action dated Mar. 30, 2007 for U.S. Appl. No. 10/304,673, 3 pages.

Office Action dated Apr. 14, 2010 for U.S. Appl. No. 12/075,027, 12 pages.

International Search Report for PCT/US2007/082124 dated Apr. 12, 2010; 1 page.

* cited by examiner

US 7,906,461 B2

THERMALLY STABLE COMPOSITIONS AND USE THEREOF IN DRILLING FLUIDS

STATEMENT OF RELATED APPLICATIONS

This application is a U.S. National Stage Patent Application of International Application No. PCT/US2007/082124 filed Oct. 22, 2007 which is incorporated herein by reference in its entirety.

BACKGROUND OF THE INVENTION

Drilling fluids have been used since the very beginning of oil well drilling operations in the United States and drilling fluids and their chemistry have been and remain an important area for scientific and chemical investigations. Certain uses and desired properties of drilling fluids are reviewed in U.S. Patent Application Publication No. 2004/0110642 and U.S. Pat. Nos. 6,339,048 and 6,462,096, issued to the assignee of this application, the entire disclosures of which are incorporated herein by reference.

Nevertheless, the demands of the oil-well drilling environment require increasing improvements in temperature stability. This becomes particularly true, for example, as the search for new sources of oil involves greater need to explore in deep water areas and to employ horizontal drilling techniques.

SUMMARY OF THE INVENTION

According to some embodiments, a composition includes a reaction product of an amine and a poly-functional isocyanate; a reaction product of (i) a carboxylic acid with at least two carboxylic moieties; and (ii) a polyamine having an amine functionality of two or more; and a chemical selected from (i) alkoxylated alkyl amines, (ii) fatty acid amides and (iii) mixtures thereof.

In some embodiments, the amine is an etheramine. In some embodiments, the composition including an organoclay.

In some embodiments, the composition includes the reaction product of (1) polyamine having an amine functionality of two or more, (2) a carboxylic acid with at least two carboxylic moieties and (3) an alkoxylated alkyl amine. In other embodiments, the composition includes the reaction product of (1) a carboxylic acid with at least two carboxylic moieties, (2) a polyamine having an amine functionality of two or more (3) an alkoxylated alkyl amine and (4) a fatty acid amide.

According to some embodiments, an oil-based drilling fluid comprising a mixture of a reaction product of an amine and a poly-functional isocyanate; a reaction product of (i) a carboxylic acid with at least two carboxylic moieties; and (ii) a polyamine having an amine functionality of two or more; and a chemical selected from (i) alkoxylated alkyl amines, (ii) fatty acid amides and (iii) mixtures thereof. In some embodiments, the drilling fluid contains one or more emulsifiers.

In some embodiments, the drilling fluid maintains rheological activity in a temperature range of about 120° F. to about 40° F. when the drilling fluid is heated to temperatures up to about 300° F. and subsequently cooled. In some embodiments, the drilling fluid demonstrates a substantially constant rheological profile in a temperature range from about 300° F. to about 40° F., or in some embodiments, a temperature range from about 120° F. to about 40° F. In some embodiments, the change in high shear rate viscosity of the drilling fluid over a temperature range of about 120° F. to about 40° F. is less that about 90%.

According to some embodiments, a composition includes a mixture of a reaction product of an etheramine and a poly-functional isocyanate, and an organoclay.

According to some embodiments, an oil based drilling fluid includes a reaction product of an amine and a poly-functional isocyanate.

According to some embodiments, a method of maintaining rheological activity of the drilling fluid at low shear rate over a temperature range of about 120° F. to about 40° F. when the drilling fluid is heated to temperatures up to about 300° F. and subsequently cooled, includes adding a drilling fluid additive to the drilling fluid, wherein the drilling fluid additive includes a reaction product of an amine and a poly-functional isocyanate; a reaction product of (i) a carboxylic acid with at least two carboxylic moieties; and (ii) a polyamine having an amine functionality of two or more; and a chemical selected from the group consisting of (i) alkoxylated alkyl amines, (ii) fatty acid amides and (iii) mixtures thereof.

According to some embodiments, a method of providing a substantially constant rheological profile of a drilling fluid over a temperature range of about 120° F. to about 40° F. includes adding a drilling fluid additive to the drilling fluid, wherein the drilling fluid additive contains a reaction product of an amine and a poly-functional isocyanate; a reaction product of (i) a carboxylic acid with at least two carboxylic moieties; and (ii) a polyamine having an amine functionality of two or more; and a chemical selected from the group consisting of (i) alkoxylated alkyl amines, (ii) fatty acid amides and (iii) mixtures thereof.

DETAILED DESCRIPTION OF THE EMBODIMENTS

In one embodiment, a composition according to the present invention may include a reaction product of an amine and a poly-functional isocyanate. In some embodiments, the composition is used as a drilling fluid additive. In some embodiments, the drilling fluid additive includes a reaction product of (i) a carboxylic acid with at least two carboxylic moieties, and (ii) a polyamine having an amine functionality of two or more; and a chemical selected from the group consisting of (i) alkoxylated alkyl amines, (ii) fatty acid amides, and (iii) mixtures thereof. The drilling fluid additive may also include an organoclay. In some embodiments, the addition of the drilling fluid additive to a drilling fluid provides improved temperature stability and extends the operating temperature range of the drilling fluid.

In some embodiments, an oil based drilling fluid incorporating a drilling fluid additive such as an additive including (a) a reaction product of (i) a carboxylic acid with at least two carboxylic moieties; and (ii) a polyamine having an amine functionality of two or more; and (b) a chemical selected from the group consisting of (i) alkoxylated alkyl amines; (ii) fatty acid amides; and (iii) mixtures thereof, is not temperature stable above 250° F. As temperatures approach 250° F., such a drilling fluid may experience significant viscosity losses. In some embodiments, an oil based drilling fluid incorporating a drilling fluid additive of the present invention extends the temperature stable limit to above about 300° F., resulting in a substantially constant rheological profile from about 300° F. to about 40° F.

Reaction Product A

According to some embodiments, a component of the drilling fluid additive includes a reaction product of an amine and a poly-functional isocyanate. In some embodiments, the reaction product is a poly-urea product.

In some embodiments, the amine includes an etheramine. Examples of suitable etheramines are disclosed in U.S. Pat. No. 6,555,614 (col. 5, lines 44-56), the disclosure of which is hereby incorporated by reference in its entirety. Examples of suitable etheramines include, but are not limited to, polyoxyethylenediamine having a molecular weight of about 104 to about 2,000 including 2-(2-aminoethoxy)ethylamine, 2-[2-(2-aminoethoxy)ethoxy]ethylamine, 2-{2-[2-(2-aminoethoxy)ethoxy]ethoxy}ethylamine; polyoxypropylenediamine having a molecular weight of about 132 to about 2,000 including 2-(2-aminopropoxy)-1-methylethylamine, 2-[2-(2-aminopropoxy)-1-methylethoxy]-1-methylethylamine, 2-{2-[2-(2-aminopropoxy)-1-methylethoxy]-1-methylethoxy}-1-methylethylamine; copolymers of polyoxyethylenediamine and polyoxypropylenediamine; and bis-(3-aminopropyl)-ether, 1,2-bis-(3-aminopropoxy)-ethane or 1,3-bis-(3-aminopropoxy)-2,2-dimethylpropane.

In some embodiments, the poly-functional isocyanate is of the general formula OCN—R'—NCO. Examples of such poly-functional isocyanates are disclosed in U.S. Pat. No. 6,683,151 (col. 3, lines 30-49) and U.S. Patent Application Publication No. 2002/0077444A1 (paragraph [0021]), the disclosures of which are hereby incorporated by reference in their entirety. In some embodiments, suitable isocyanates have a functionality of at least two such as, for instance, diisocyanates, 1,4-diisocyanato-4-methyl-pentane, 1,5-diisocyanato-5-methylhexane, 3(4)-isocyanatomethyl-1-methylcyclohexyl isocyanate, 1,6-diisocyanato-6-methyl-heptane, 1,5-diisocyanato-2,2,5-trimethylhexane and 1,7-diisocyanato-3,7-dimethyloctane, or 1-isocyanato-1-methyl-4-(4-isocyanatobut-2-yl)-cyclohexene, 1-isocyanato-1,2,2-trimethyl-3-(2-isocyanato-ethyl)-cyclopentane, 1-isocyanato-1,4-dimethyl-4-isocyanatomethyl-cyclohexane, 1-isocyanato-1,3-dimethyl-3-isocyanatomethyl-cyclohexane, 1-isocyanatol-n-butyl-3-(4-isocyanatobut-1-yl)-cyclopentane and 1-isocyanato-1,2-dimethyl-3-ethyl-3-isocyanatomethyl-cyclopentane, 3(4)-isocyanatomethyl-1-methylcyclohexyl isocyanate (IMCI), toluene diisocyanate (TDI), methylene diphenyl diisocyanate (MDI), methylene dicyclohexane 4,4-diisocyanate, isophorone diisocyanate (IPDI), hexane diisocyanate (HDI) and the like.

According to some embodiments, suitable isocyanates include, but are not limited to, tetramethylene diisocyanate, 1,6-diisocyanatohexane, 1,6-hexamethylene diisocyanate, dodecamethylene diisocyanate, cyclohexane-1,3- and 1,4-diisocyanate, 1-isocyanato-3-isocyanatomethyl-3,-5,5-trimethylcyclohexane (=isophorone diisocyanate), bis-(4-isocyanatocyclohexyl)methane (=hydrogenated MDI), 2- and 4-isocyanatocyclohexyl-2'-isocyanatocyclohexylmethane, 1,3- and 1,4-bis-(isocyanatomethyl)-cyclohexane, bis-(4-isocyanato-3-methylcyclohexyl)methane, 1,3- and 1,4-tetramethylxylidene diisocyanate, 2,4- and/or 2,6-diisocyanatotoluene, 2,2'-, 2,4'- and/or 4,4'-diisocyanatodiphenylmethane. 1,5-naphthalene diisocyanate, p- and m-phenylene diisocyanate, xylylene diisocyanate, diphenyl-4,4'-diisocyanate, carbodiimide-modified liquid MDI, polymeric MDI, and the like.

In some embodiments, the reaction product provides a poly-urea drilling fluid additive that extends the substantially constant rheological profile in a wider temperature range in systems that already use additives to stabilize the rheological profile. According to one embodiment, poly-urea reaction product is combined with compositions described in U.S. Patent Application Publication No. 2004/0102332A1, the disclosure of which is hereby incorporated in its entirety. In another embodiment, the poly-urea reaction product is combined with 1) the reaction product of a polyamine having an amine functionality of two or more, and a carboxylic acid having at least two carboxylic moieties, and 2) an alkoxylated amine and/or fatty amide and mixtures thereof.

Specifics on processing of amines and poly-functional isocyanates are well known and can be used in making the reaction product for incorporation in the drilling fluid additive. In some embodiments, the molar ratio between the amine and the poly-functional isocyanate is about 4:1 to about 0.5:1. In some embodiments, the molar ratio between the amine and the poly-functional isocyanate is about 3:1 to about 1:1. In other embodiments, the molar ratio between the amine and the poly-functional isocyanate is about 2:1 to about 1:1.

In some embodiments, a precipitate may be formed from the reaction between an amine and an isocyanate. In some embodiments, the precipitate may be filtered, washed with methanol, and dried.

Reaction Product B

In some embodiments, a drilling fluid additive includes a reaction product of (i) a carboxylic acid with at least two carboxylic moieties, and (ii) a polyamine having an amine functionality of two or more. In some embodiments, the components of the reaction product also include a chemical selected from the group consisting of (i) alkoxylated alkyl amines, (ii) fatty acid amides, and (iii) mixtures thereof.

Carboxylic Acids

Any carboxylic acid with at least two carboxylic moieties can be used for producing the reaction product component of the drilling fluid additive. In some embodiments, the carboxylic acid is a dimer acid. In some embodiments, the carboxylic acid includes dimer acids of $C_{16}$ and/or $C_{18}$ fatty acid. In certain embodiments, such dimer acids are fully hydrogenated, partially hydrogenated, or not hydrogenated at all. In some embodiments, dimer acids include products resulting from the dimerization of $C_{16}$ to $C_{18}$ unsaturated fatty acids.

In some embodiments, the dimer acids have an average of about 18 to about 48 carbon atoms. In some embodiments, the dimer acids have an average of about 20 to 40 carbon atoms. In one embodiment, the dimer acids have an average of about 36 carbon atoms.

Suitable dimer acids may be prepared from $C_{18}$ fatty acids, such as oleic acids. Examples of suitable dimer acids are described in U.S. Pat. Nos. 2,482,760, 2,482,761, 2,731,481, 2,793,219, 2,964,545, 2,978,468, 3,157,681, and 3,256,304, the entire disclosures of which are incorporated herein by reference.

Examples of suitable dimer acids include the Empol® product line available from Cognis Inc. (eg: Empol® 1061), and Pripol® dimer acids available from Uniqema (eg: Pripol® 1013).

Many commercially available dimer fatty acids contain a mixture of monomer, dimer, and trimer acids. In some embodiments, the dimer fatty acid has a specific dimer content as increased monomer and trimer concentration may hinder the additive's performance. In some embodiments, commercial products are distilled or otherwise processed to ensure certain suitable dimer content. In some embodiments, suitable dimer acid has a dimer content of at least about 80%. In some embodiments, suitable dimer acid has a dimer content of at least about 90%. An example of a suitable dimer acid includes Empol® 1061, which has a dimer acid content of 92.5%-95.5%, a trimer acid content of 1.5%-3.5% and a monoacid content of 2.5%-5.0%.

Polyamines

According to some embodiments, polyamines having an amine functionality of two or more are used for the preparation of a reaction product that may be incorporated in the drilling fluid additive. In some embodiments, polyamines from the family of polyethylene polyamines having an amine functionality of two or more are used.

Di-, tri-, and polyamines and their combinations may be suitable for use in the drilling fluid additive. Examples of such amines may include ethylenediamine, diethylenetriamine, triethylenetetramine, tetraethylenepentamine and other members of this series. In some embodiments, branched polyamines and polyamines made with different alkyl groups are used.

In some embodiments, a suitable triamine is diethylenetramine (DETA). DETA has been assigned a CAS No. of 111-40-0 and is commercially available from Huntsman International.

Additional Components

In some embodiments, the components of the reaction product also include at least one of (i) alkoxylated alkyl amines, (ii) fatty acid amides, and (iii) mixtures thereof. Suitable alkoxylated alkyl amines and fatty acid amides are described in detail below.

Making the Reaction Product

Specifics on processing of polyamines and carboxylic acids are well known and can be used in making the reaction product for incorporation in the drilling fluid additive. In some embodiments, the molar ratio between the amine functional group and carboxyl functional group is about 4:1 to about 1:1. In some embodiments, the molar ratio between the amine functional group and carboxyl functional group is about 1.5:1 to about 3:1. In some embodiments, the molar ratio between the amine functional group and carboxyl functional group is about 2:1. For example, mixtures of more than one dimer acid and/or more than one polyamine can be used. In some embodiments, these reactions may generate imidazolines and other side products.

Component C

Alkoxylated Alkyl Amines

In some embodiments, a suitable alkoxylated alkyl amine is mixed into or blended into the reaction product produced by the reaction of the carboxylic acid with the polyamine as described above and/or the reaction product produced by the reaction of an amine and a poly-functional isocyanate as described above. In some embodiments, a suitable alkoxylated alkyl amine is added directly to the drilling mud. In other embodiments, a suitable alkoxylated alkyl amine is reacted with a carboxylic acid and a polyamine to form a reaction product. In other embodiments, a suitable alkoxylated alkyl amine is reacted with a carboxylic acid, a polyamine, and a fatty acid amide to form a reaction product.

Many alkyl alkoxylated amines are suitable for the drilling fluid additive. Any alkoxylated amine or similarly derivatized amines may be used. Suitable alkoxylated amines may include amines of various degrees of alkoxylation. Examples of useful chemicals include, but are not limited to, the entire Ethomeen®, Propomeen® and the Ethoduomeen® product lines of Akzo Nobel.

In some embodiments, suitable amines include amines with up to about 50 units of alkoxylation per molecule (e.g. Ethomeen® 18/60). In some embodiments, suitable amines include amines with up to about 15-25 units of alkoxylation (e.g. Ethomeen® C/25, T/25, S/25, 18/25; Ethoduomeen® T/25). In other embodiments, suitable amines include amines with up to about 10 units of alkoxylation (e.g. Propomeen® C/12, O/12, T/12; Ethoduomeen® T/13, T/20; Ethomeen® C/12, C/15, C/20, O/12, O/15, T/12, T/15, S/12, S/15, S/20, 18/12, 18/15 and 18/20).

In some embodiments, suitable amines include polyoxyethylene (5) cocoalkylamines, available, for example, under the tradename Ethomeen® C/15 from Akzo Nobel (New Brunswick, N.J.). Ethomeen® C/15 has a general formula of $RN[(CH_2CH_2O)_m(CH_2CH_2O)_nH]$ wherein R is cocoalkyl, and m+n=5.

Optionally, the alkoxylated amine may be added prior to the reaction between the carboxylic acid and polyamines, or blended after the reaction step. If added prior to the reaction or at the reaction temperature, some esters may be formed between the dimer acid carboxyls and the alkoxylated amine hydroxyls.

In some embodiments, the reaction product and an alkoxylated alkyl amine are mixed or blended in a weight ratio range of about 95:5 to about 5:95 reaction product to alkoxylated amine. In some embodiments, the reaction product and an alkoxylated alkyl amine are mixed or blended in a weight ratio range of about 80:20 to about 30:70 reaction product to alkoxylated amine. In other embodiments, the reaction product and an alkoxylated alkyl amine are mixed or blended in a weight ratio range of about 55:45 reaction product to alkoxylated amine.

Fatty Acid Amides

Optionally, additional ingredients such as fatty amides and related alkoxylated derivatives can be blended into or reacted with the reaction products described above. In some embodiments, a suitable fatty amide is mixed into or blended into the reaction product produced by the reaction of the carboxylic acid with the polyamine as described above and/or the reaction product produced by the reaction of an amine and a poly-functional isocyanate as described above. In some embodiments, a suitable fatty amide is added directly to the drilling mud. In other embodiments, a suitable fatty amide is reacted with a carboxylic acid and a polyamine to form a reaction product. In other embodiments, a suitable fatty amide is reacted with a carboxylic acid, a polyamine, and a fatty acid amide to form a reaction product.

In some embodiments, suitable fatty amides are amides of fatty acids that are sparingly soluble in drilling fluids. In some embodiments, suitable fatty amides include high temperature melting amides of fatty acids that are sparingly soluble in drilling muds, such as the Armid® product line by Akzo Nobel. In some embodiments, alkoxylated fatty amides, such as the Ethomid® product line by Akzo Nobel can be used. For example, a suitable alkoxylated fatty amide may include Ethomid® O/17 which has 7 moles of EO on oleamide.

Preparation of the Drilling Fluids

In some embodiments, compositions according to the present invention may be used as an additive to oil-based drilling fluids. In some embodiments, compositions according to the present invention may be used as an additive for oil-based invert emulsion drilling fluids employed in a variety of drilling applications.

The term oil-based drilling fluid is defined as a drilling fluid in which the continuous phase is hydrocarbon based. Oil-based drilling fluids formulated with over 5% water or brine may be classified as oil-based invert emulsion drilling fluids. In some embodiments, oil-based invert emulsion drilling fluids may contain water or brine as the discontinuous phase in any proportion up to about 50%.

According to some embodiments, a process for preparing invert emulsion drilling fluids (oil muds) involves using a mixing device to incorporate the individual components making up that fluid. In some embodiments, primary and secondary emulsifiers and/or wetting agents (surfactant mix) are added to the base oil (continuous phase) under moderate agitation. The water phase, typically a brine, may be added to the base oil/surfactant mix along with alkalinity control agents and acid gas scavengers. In some embodiments, rheological additives as well as fluid loss control materials, weighting agents and corrosion inhibition chemicals may also be included. The agitation may then be continued to ensure dispersion of each ingredient and homogenize the resulting fluidized mixture.

Oil Base

According to some embodiments, diesel oil, mineral oil, synthetic oil, vegetable oil, fish oil, paraffinics, and/or ester-based oils can all be used as single components or as blends.

Brine Content

In some embodiments, water in the form of brine is often used in forming the internal phase of the drilling fluids. According to some embodiments, water can be defined as an aqueous solution which can contain from about 10 to 350,000 parts-per-million of metal salts such as lithium, sodium, potassium, magnesium, cesium, or calcium salts. In some embodiments, brines used to form the internal phase of a drilling fluid according to the present invention can also contain about 5% to about 35% by weight calcium chloride and may contain various amounts of other dissolved salts such as sodium bicarbonate, sodium sulfate, sodium acetate, sodium borate, potassium chloride, sodium chloride or formates (such as sodium, calcium, or cesium). In some embodiments, glycols or glycerin can be used in place of or in addition to brines.

In some embodiments, the ratio of water (brine) to oil in the emulsions according to the present invention may provide as high a brine content as possible while still maintaining a stable emulsion. In some embodiments, suitable oil/brine ratios may be in the range of about 97:3 to about 50:50. In some embodiments, the preferred oil/brine ratio may depend upon the particular oil and mud weight. According to some embodiments, the water content of a drilling fluid prepared according to the teachings of the invention may have an aqueous (water) content of about 0 to 50 volume percent.

Organoclays

In some embodiments, the drilling fluid additive includes an organoclay. According to some embodiments, organoclays made from at least one of bentonite, hectorite and attapulgite clays are added to the drilling fluid additive. There are a large number of suppliers of such clays in addition to Elementis Specialties' BENTONE® product line including Rockwood Specialties, Inc. and Sud Chemie GmbH.

Emulsifiers

According to some embodiments, an emulsifier can also be added to the drilling fluid in order to form a more stable emulsion. The emulsifier may include organic acids, including but not limited to the monocarboxyl alkanoic, alkenoic, or alkynoic fatty acids containing from 3 to 20 carbon atoms, and mixtures thereof. Examples of this group of acids include stearic, oleic, caproic, capric and butyric acids. In some embodiments, adipic acid, a member of the aliphatic dicarboxylic acids, can also be used. According to some embodiments, suitable surfactants or emulsifiers include fatty acid calcium salts and lecithin. In other embodiments, suitable surfactants or emulsifiers include oxidized tall oil, polyaminated fatty acids, and partial amides of fatty acids.

In some embodiments, heterocyclic additives such as imidazoline compounds may be used to regulate the flow properties of the drilling muds. In other embodiments, alkylpyridines may be used to regulate the flow properties of the drilling muds.

Industrially obtainable amine compounds for use as emulsifiers may be derived from the epoxidation of olefinically unsaturated hydrocarbon compounds with subsequent introduction of the N function by addition to the epoxide group. The reaction of the epoxidized intermediate components with primary or secondary amines to form the corresponding alkanolamines may be of significance in this regard. In some embodiments, polyamines, particularly lower polyamines of the corresponding alkylenediamine type, are also suitable for opening of the epoxide ring.

Another class of the oleophilic amine compounds that may be suitable as emulsifiers are aminoamides derived from preferably long-chain carboxylic acids and polyfunctional, particularly lower, amines of the above-mentioned type. In some embodiments, at least one of the amino functions is not bound in amide form, but remains intact as a potentially salt-forming basic amino group. The basic amino groups, where they are formed as secondary or tertiary amino groups, may contain hydroxyalkyl substituents and, in particular, lower hydroxyalkyl substituents containing up to 5 and in some embodiments up to 3 C atoms in addition to the oleophilic part of the molecule.

According to some embodiments, suitable N-basic starting components for the preparation of such adducts containing long-chain oleophilic molecule constituents may include but are not limited to monoethanolamine or diethanolamine.

In some embodiments, weighting materials are also used to weight the drilling fluid additive to a desired density. In some embodiments, the drilling fluid is weighted to a density of about 8 to about 18 pounds per gallon and greater. Suitable weighting materials may include barite, ilmenite, calcium carbonate, iron oxide and lead sulfide. In some embodiments, commercially available barite is used as a weighting material.

Blending Process

In some embodiments, drilling fluids may contain about ¼ pound to about 15 pounds of the drilling fluid additive per barrel of fluids. In other embodiments, drilling fluids may contain about ¼ pound to 10 pounds of the drilling fluid additive per barrel of fluids, and in still other embodiments, drilling fluids may contain about ¼ pound to 5 pounds of the drilling fluid additive per-barrel of fluids.

As shown above, a skilled artisan will readily recognize that additional additives such as weighting agents, emulsifiers, wetting agents, viscosifiers, fluid loss control agents, and other agents can be used with a composition according to the present invention. A number of other additives besides rheological additives regulating viscosity and anti-settling properties can also be used in the drilling fluid so as to obtain desired application properties, such as, for example, anti-settling agents and fluid loss-prevention additives.

Method of Use

In some embodiments, a drilling fluid additive may be added to a drilling fluid. In some embodiments, the drilling fluid additive may be added to a drilling fluid in combination with other additives, such as Thixatrol® DW and Bentone® 155, both by Elementis Specialties.

In some embodiments, a drilling fluid additive is added to a drilling fluid in an amount of about 0.25 ppb to about 30 ppb. In other embodiments, a drilling fluid additive is added to a drilling fluid in an amount of about 5.0 ppb to about 15.0 ppb. In other embodiments, a drilling fluid additive is added to a drilling fluid in an amount of about 0.25 ppb to about 5 ppb.

In some embodiments, the addition of the drilling fluid additive to a drilling fluid results in a substantially constant rheological profile throughout a temperature range. A substantially constant rheological profile of a drilling fluid may be associated with a low change in viscosity of the drilling fluid as the temperature of the drilling fluid is reduced to temperatures typically encountered in the riser in deep water drilling. In some embodiments, the change in high shear rate viscosity of a drilling fluid is less than about 90% over a temperature range of about 120° F. to about 40° F. In other embodiments, the change in high shear rate viscosity of a drilling fluid is less than about 85% over a temperature range of about 120° F. to about 40° F. In some embodiments, the change in high shear rate viscosity is less than about 80% over a temperature range of about 120° F. to about 40° F. In some embodiments, the change in high shear rate viscosity is less than about 75% over a temperature range of about 120° F. to about 40° F. The viscosity of the drilling fluid may be measured according to API RP 13B.

In some embodiments, the drilling fluid additive is added to a drilling fluid to provide a substantially constant rheological profile throughout a temperature range of about 300° F. to about 200° F. In some embodiments, the drilling fluid additive is added to a drilling fluid to provide a substantially constant rheological profile throughout a temperature range of about 300° F. to about 150° F. In some embodiments, the drilling fluid additive is combined with other drilling fluid additives in a drilling fluid to provide a substantially constant rheological profile throughout a temperature range of about 300° F. to about 40° F. In some embodiments, the drilling fluid additive is combined with other drilling fluid additives in a drilling fluid to provide a substantially constant rheological profile throughout a temperature range of about 120° F. to about 40° F.

A drilling fluid exhibits rheological activity when the drilling fluid has a viscosity at low shear rate of at least about 3. In some embodiments, the drilling fluid additive is added to a drilling fluid to maintain rheological activity of the drilling fluid when the drilling fluid is heated to temperatures up to or above about 300° F. and subsequently cooled. In some embodiments, the drilling fluid additive is added to a drilling fluid to maintain rheological activity of the drilling fluid at low shear rate, such as about 6 RPM, when the drilling fluid is heated to temperatures up to or above about 300° F. and subsequently cooled. In some embodiments, the drilling fluid additive is added to a drilling fluid to maintain rheological activity of the drilling fluid in a temperature range of about 120° F. to about 40° F. when the drilling fluid is heated to temperatures up to or above about 300° F. and subsequently cooled.

In some embodiments, the addition of the inventive drilling fluid additive to a drilling fluid provides higher temperature stability than the addition of known drilling fluid additives. In some embodiments, the inventive drilling fluid additive provides temperature stability from a temperature range from about 300° F. to about 40° F. In some embodiments, the addition of the inventive drilling fluid additive to a drilling fluid provides temperature stability at a temperature at least 50° F. higher than the addition of a known drilling fluid additive. In some embodiments, a drilling fluid containing the inventive drilling fluid additive maintains rheological activity at high temperatures. In some embodiments, a drilling fluid containing the inventive drilling fluid additive maintains rheological activity at temperatures up to or above about 300° F.

In some embodiments, a drilling fluid according to the present invention may have a lower viscosity at 40° F. than conventional muds formulated with sufficient organoclay to provide suspension at bottom hole temperatures. When used in drilling operations, drilling fluids according to the present invention may allow the use of a lower pumping power to pump drilling muds through long distances, thereby reducing down-hole pressures. Consequently, in some embodiments, fluid loss, fracturing and damage of the formation are all minimized. In some embodiments, drilling fluids according to the present invention may maintain the suspension characteristics typical of higher levels of organoclays at higher temperatures. The present invention may be particularly useful in deep water drilling when the mud is cooled in the riser. A mud using a drilling fluid additive according to the present invention will maintain a reduced viscosity increase in the riser when compared to drilling fluids containing conventional rheological additives.

EXAMPLES

A drilling fluid was prepared based on the formulation in Table 1 for use in the following Examples.

TABLE 1

Drilling Fluid Formulation

| Fluid Formulation | Lbs./BBL |
| --- | --- |
| Synthetic Based Oil | 186 |
| Primary Emulsifier | 4 |
| Secondary Emulsifier | 2 |
| 30% Calcium Chloride Brine | 75 |
| Lime | 4 |
| Rheological Additive | See Tables for Concentrations |
| Barite | 215 |

All fluids were prepared and tested according to standard API RP 13B mud preparation guidelines using standard malt cups and a 5 spindle Hamilton Beach multimixer. The prepared fluids were placed in 316 stainless steel heat age cells. The fluids were hot rolled according to API RP 13B procedures. The cells were placed in a roller oven set at 150° F. or 300° F. for 16 hours. The cells were taken out and quenched in a sink filled with cold water and were cooled to room temperature (about 64° F. to about 73° F.). Rheological measurements were taken initially and after each hot roll cycle at 120° F. and 40° F. using a Fann model 35 Rheometer. Measurements were taken as per API RP 13B procedures.

Example 1

Prior Art

BENTONE 155®, an organoclay, was added to a synthetic oil-based invert emulsion drilling fluid in amounts of 2.0 ppb and 6.0 ppb. The viscosity measurements at various shear rates and temperatures of the drilling fluid with the organoclay are included in Table 2. Table 2 shows that an oil-based drilling fluid incorporating organoclay (BENTONE 155®) alone as a rheological modifier exhibited a high shear rate (600 rpm) viscosity increase of 164.7% (34 to 90) at 2 ppb rheological agent when the temperature was reduced from 120° F. to 40° F., and a high shear rate viscosity increase of 203.3% (60 to 182) at 6 ppb rheological agent when the temperature was reduced from 120° F. to 40° F. The drilling fluid exhibited a low shear rate (6 rpm) viscosity increase of 450% (2 to 11) at 2 ppb rheological additive when the temperature was reduced from 120° F. to 40° F., and a low shear rate viscosity increase of 233.3% (12 to 40) at 6 ppb rheological agent when the temperature was reduced from 120° F. to 40° F.

TABLE 2

BENTONE® 155 CONCENTRATION EVALUATION

| | Additive | | | | | |
|---|---|---|---|---|---|---|
| | BENTONE® 155 | | | BENTONE® 155 | | |
| | Additive(s) Concentration | | | | | |
| OFI 800 Viscosity @ 120° F. | 2.0 ppb Initial | 2.0 ppb HR 150° F. Test 120° F. Test | 2.0 ppb HR 150° F. Test 40° F. Test | 6.0 ppb Initial | 6.0 ppb HR 150° F. Test 120° F. Test | 6.0 ppb HR 150° F. Test 40° F. Test |
| 600 RPM Reading | 34 | 34 | 90 | 67 | 60 | 182 |
| 300 RPM Reading | 20 | 19 | 58 | 44 | 42 | 126 |
| 200 RPM Reading | 14 | 13 | 45 | 34 | 34 | 105 |
| 100 RPM Reading | 8 | 8 | 31 | 24 | 26 | 81 |
| 6 RPM Reading | 2 | 2 | 11 | 8 | 12 | 40 |
| 3 RPM Reading | 1 | 1 | 10 | 7 | 11 | 35 |
| Apparent Visc., cPs | 17 | 17 | 45 | 34 | 30 | 91 |
| Plastic Visc., cPs | 14 | 15 | 32 | 23 | 18 | 56 |
| Yield Point, Lbs/100 ft^2 | 6 | 4 | 26 | 21 | 24 | 70 |

Example 2

Prior Art 1.0 ppb THIXATROL® DW, which is an example of Reaction Product B combined with an alkoxylated alkyl amine, was combined with 2.0 ppb BENTONE® 155 in an oil-based drilling fluid. Table 3 shows viscosity measurements of the drilling fluid with the additives. The drilling fluid was hot rolled at 150° F. or at 300° F., and subsequently cooled, according to API RP 13B procedures. The viscosity measurements were taken at various shear rates and temperatures. Table 3 shows that the high shear rate (600 rpm) viscosity of the drilling fluid increased by 85.2% (54 to 100) when the temperature of the viscosity measurement was reduced from 120° F. to 40° F. As shown in Table 2, the high shear rate viscosity of a drilling fluid containing solely 2 ppb BENTONE® 155 increased by 164.7% (34 to 90) when the temperature of the viscosity measurement was reduced from 120° F. to 40° F.

Table 3 shows that the low shear rate (6 rpm) viscosity of the drilling fluid containing both THIXATROL® DW and BENTONE® 155 increased by 12.5% (8 to 9) as the temperature was reduced from 120° F. to 40° F. As shown in Table 2, the low shear rate viscosity of a drilling fluid containing solely 2 ppb BENTONE® 155 increased by 450% (2 to 11) when the temperature was reduced from 120° F. to 40° F.

Table 3 shows that when the hot rolled (HR) temperature was increased from 150° F. to 300° F., the low shear rate viscosity at 120° F. of the drilling fluid containing both THIXATROL® DW and BENTONE® 155 decreased by 87.5% (8 to 1).

TABLE 3

Impact of Thixatrol DW® on Viscosity: Temperature Profile

| | Additive | | | | |
|---|---|---|---|---|---|
| | BENTONE® 155/ Thixatrol® DW | | | | |
| | Additive(s) Concentration 2 ppb/1 ppb | | | | |
| OFI 800 Viscosity @ 120° F. | Initial | HR 150° F. 120° F. Test | HR 150° F. 40° F. Test | HR 300° F. 120° F. Test | HR 300° F. 40° F. Test |
| 600 RPM Reading | 44 | 54 | 100 | 37 | 48 |
| 300 RPM Reading | 24 | 34 | 60 | 19 | 26 |
| 200 RPM Reading | 18 | 25 | 45 | 12 | 18 |
| 100 RPM Reading | 12 | 17 | 27 | 6 | 10 |
| 6 RPM Reading | 5 | 8 | 9 | 1 | 1 |
| 3 RPM Reading | 4 | 7 | 8 | 1 | 1 |
| Apparent Visc., cPs | 22 | 27 | 50 | 19 | 24 |
| Plastic Visc., cPs | 20 | 20 | 40 | 18 | 22 |
| Yield Point. Lbs/100 ft^2 | 4 | 14 | 20 | 1 | 4 |

Example 3

An example of Reaction Product A was prepared by reacting 293 mmol $C_{12-15}$ alkyloxypropylamine with 145 mmol 1,6-diisocyanatohexane, to form an example drilling fluid additive. 10.0 ppb of the example drilling fluid additive was combined with 1.0 ppb THIXATROL® DW (an example of Reaction Product B combined with an alkoxylated alkyl amine) and 1.0 ppb BENTONE® 155 in an oil-based drilling fluid. The drilling fluid was hot rolled at 150° F. or at 300° F., and subsequently cooled, according to API RP 13B procedures. The viscosity measurements were taken at various shear rates and temperatures. Table 4 shows that the high shear rate (600 rpm) viscosity of the drilling fluid containing the example drilling fluid additive, THIXATROL® DW, and BENTONE® 155 increased by 83.6% (55 to 101) when the temperature was reduced from 120° F. to 40° F. As shown Table 2, the high shear rate viscosity of the drilling fluid containing solely 2.0 ppb BENTONE® 155 increased by 164.7% (34 to 90) when the temperature was reduced from 120° F. to 40° F.

Table 4 shows that the low shear rate (6 rpm) viscosity of the drilling fluid containing the example drilling fluid additive, THIXATROL® DW, and BENTONE® 155 increased by 28.6% (7 to 9) when the temperature was reduced from 120° F. to 40° F. As shown in Table 2, the low shear rate viscosity of the drilling fluid containing solely 2 ppb of the BENTONE® 155 increased by 450% (2 to 11) when the temperature was reduced from 120° F. to 40° F.

When the hot rolled temperature is increased from 150° F. to 300° F. the drilling mud exhibits a 71.4% low shear rate increase (7 to 12) at 120° F. compared to the 87.5% decrease in low shear viscosity when 2 ppb of BENTONE® 155 and 1 ppb of THIXATROL® DW was used as shown in Table 3.

Additionally, Table 4 shows that when the hot rolled temperature is increased from 150° F. to 300° F., the drilling mud maintains rheological activity a low shear rate (6 rpm). As shown in Table 3, the drilling mud containing 2 ppb of BENTONE® 155 and 1 ppb of THIXATROL® DW has no rheological activity at low shear rate when the hot rolled temperature is increased from 150° F. to 300° F.

TABLE 4

Impact of Thixatrol DW ® and an Example Drilling Fluid Additive on Viscosity: Temperature Profile

| | Additive BENTONE ® 155/ Example Drilling Fluid Additive/Thixatrol ® DW | | | | |
|---|---|---|---|---|---|
| | Additive(s) Concentration 1.0 ppb/10 ppb/ 1.0 ppb | | | | |
| OFI 800 Viscosity @ 120° F. | Initial | HR 150° F. 120° F. Test | HR 150° F. 40° F. Test | HR 300° F. 120° F. Test | HR 300° F. 40° F. Test |
| 600 RPM Reading | 46 | 55 | 101 | 78 | 119 |
| 300 RPM Reading | 28 | 33 | 60 | 50 | 74 |
| 200 RPM Reading | 30 | 24 | 45 | 38 | 55 |
| 100 RPM Reading | 13 | 16 | 28 | 26 | 35 |
| 6 RPM Reading | 5 | 7 | 9 | 12 | 12 |
| 3 RPM Reading | 4 | 6 | 8 | 10 | 11 |
| Electrical Stability | | | | | |
| Apparent Visc., cPs | 23 | 28 | 51 | 39 | 60 |
| Plastic Visc., cPs | 18 | 22 | 41 | 28 | 45 |
| Yield Point, Lbs/100 ft^2 | 10 | 11 | 19 | 22 | 29 |

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

We claim:

1. A composition, comprising a mixture of (a) a reaction product of an etheramine and a poly-functional isocyanate, and (b) a reaction product of (i) a carboxylic acid with at least two carboxylic moieties; and (ii) a polyamine having an amine functionality of two or more; and (c) a chemical selected from the group consisting of (i) alkoxylated alkyl amines, (ii) fatty acid amides and (iii) mixtures thereof.

2. The composition of claim 1, wherein reaction product (b) comprises the reaction product of (1) polyamine having an amine functionality of two or more, (2) a carboxylic acid with at least two carboxylic moieties and (3) an alkoxylated alkyl amine.

3. The composition of claim 1, wherein reaction product (b) comprises a reaction product of: (1) a carboxylic acid with at least two carboxylic moieties, (2) a polyamine having an amine functionality of two or more (3) an alkoxylated alkyl amine and (4) a fatty acid amide.

4. The composition of claim 1, further comprising an organoclay.

5. An oil based drilling fluid comprising the composition of claim 1.

6. An oil-based drilling fluid comprising a mixture of: (a) a reaction product of an amine and a poly-functional isocyanate, and (b) a reaction product of (i) a carboxylic acid with at least two carboxylic moieties; and (ii) a polyamine having an amine functionality of two or more; and (c) a chemical selected from the group consisting of (i) alkoxylated alkyl amines, (ii) fatty acid amides and (iii) mixtures thereof.

7. The drilling fluid of claim 6, wherein the amine is an etheramine.

8. The drilling fluid of claim 6, wherein reaction product (b) comprises the reaction product of (1) polyamine having an amine functionality of two or more, (2) a carboxylic acid with at least two carboxylic moieties and (3) an alkoxylated alkyl amine.

9. The drilling fluid of claim 6, wherein reaction product (b) comprises a reaction product of: (a) a carboxylic acid with at least two carboxylic moieties, (b) a polyamine having an amine functionality of two or more (c) an alkoxylated alkyl amine and (d) a fatty acid amide.

10. The drilling fluid of claim 6, further comprising an organoclay.

11. The drilling fluid of claim 6, further comprising one or more emulsifiers.

12. The drilling fluid of claim 6, wherein the drilling fluid maintains rheological activity at a low shear rate of 6 rpm in a temperature range of about 120° F., to about 40° F. after the drilling fluid is heated to temperatures up to about 300° F. and subsequently cooled to room temperature.

13. The drilling fluid of claim 6, wherein the drilling fluid demonstrates a substantially constant rheological profile in a temperature range from about 120° F. to about 40° F.

14. The drilling fluid of claim 6, wherein the change in viscosity at a high shear rate of 600 rpm of the drilling fluid over a temperature range of about 120° F. to about 40 F is less that about 90%.

15. A composition, comprising a mixture of (a) a reaction product of an etheramine and a poly-functional isocyanate, and (b) an organoclay.

16. An oil based drilling fluid comprising a reaction product of an amine and a poly-functional isocyanate.

17. The drilling fluid of claim 16, further comprising an organoclay.

18. The drilling fluid of claim 17, further comprising one or more emulsifiers.

19. The drilling fluid of claim 16, wherein the amine is an etheramine.

20. The drilling fluid of claim 16, wherein the drilling fluid maintains rheological activity at a low shear rate of 6 RPM in a temperature range of about 120° F. to about 40° F. after the drilling fluid is heated to temperatures up to about 300° F. and subsequently cooled to room temperature.

21. The drilling fluid of claim 16, wherein the drilling fluid demonstrates a substantially constant rheological profile in a temperature range from about 120° F. to about 40° F.

22. The drilling fluid of claim 16, wherein the change in viscosity at a high shear rate of 600 RPM, the drilling fluid over a temperature range of about 120° F. to about 40° F. is less that about 90%.

23. A method of maintaining rheological activity of a drilling fluid at a low shear rate of 6 RPM over a temperature range of about 120° F. to about 40° F. after the drilling fluid is heated to temperatures up to about 300° F. and subsequently cooled to room temperature, comprising adding a drilling fluid additive to the drilling fluid, wherein the drilling fluid additive comprises (a) a reaction product of an amine and a poly-functional isocyanate, and (b) a reaction product of (i) a carboxylic acid with at least two carboxylic moieties; and (ii) a polyamine having an amine functionality of two or more; and (c) a chemical selected from the group consisting of (i) alkoxylated alkyl amines, (ii) fatty acid amides and (iii) mixtures thereof.

24. The method of claim 23, wherein the drilling fluid maintains a substantially constant rheological profile over a temperature range of about 120° F. to about 40° F.

25. The method of claim 23, wherein the change in viscosity at a high shear rate of 600 RPM of the drilling fluid is less than about 90% over a temperature range of about 120° F. to about 40° F.

26. A method of providing a substantially constant rheological profile of a drilling fluid over a temperature range of about 120° F. to about 40° F. comprising adding a drilling fluid additive to the drilling fluid, wherein the drilling fluid additive comprises (a) a reaction product of an amine and a poly-functional isocyanate, and (b) a reaction product of (i) a carboxylic acid with at least two carboxylic moieties; and (ii) a polyamine having an amine functionality of two or more; and (c) a chemical selected from the group consisting of (i) alkoxylated alkyl amines, (ii) fatty acid amides and (iii) mixtures thereof.

27. The method of claim 26 wherein the change in viscosity, at a high shear rate of 600 RPM, of the drilling fluid is less than about 90% over a temperature range of about 120° F. to about 40° F.

28. The method of claim 26, wherein the drilling fluid maintains rheological activity at a low shear rate of 6 RPM in a temperature range of about 120° F. to about 40° F. after the drilling fluid is heated to temperatures up to about 300° F. and subsequently cooled room temperature.

* * * * *